Patented Feb. 7, 1928.

1,658,230

UNITED STATES PATENT OFFICE.

CHARLES RAYMOND DOWNS, OF NEW HAVEN, CONNECTICUT, ASSIGNOR TO WEISS AND DOWNS, INC., OF NEW YORK, N. Y., A CORPORATION OF NEW YORK.

PROCESS FOR THE FUSION OF AROMATIC SULPHONIC COMPOUNDS.

No Drawing.  Application filed August 30, 1924. Serial No. 735,204.

This invention relates of the conversion of the sulphonic derivatives of aromatic compounds to aromatic hydroxyl compounds by heating the former with a caustic alkali. Although this invention is applicable to the production of many aromatic hydroxyl compounds, it is described more particularly in connection with the production of the disodium salt of resorcinol from disodium benzine disulphonates.

According to the prior art there have been several processes proposed and used for the substitution of hydroxyl groups for sulphonic acid groups attached to aromatic nuclei by heating with an alkali metal hydroxide. The universal custom has been to carry out this reaction in a liquid condition which has been attained either by using a large excess of caustic soda producing a liquid melt or fusion, or with only a small excess of caustic in water solution under pressure to prevent loss of water. The former method has been the one most widely used in actual production of phenol, resorcinol and other phenols. This process is described in text books and referred to in patents. For instance, in U. S. Patent 1,210,726 to Tyrer, page 1, lines 79 et seq. 3 molecular proportions of caustic soda to 1 molecular proportion of sodium benzenesulphonate are used for the fusion step in the synthesis of phenol. This is an excess over the theory required of 1 molecule of caustic soda. This or a greater excess is necessary to produce a liquid melt or fusion. Also in U. S. Patent 1,213,142 Aylsworth correctly describes the prior art on page 1, lines 33 et seq. in which he states that the reaction is carried out by fusing the sulphonate with a large excess of caustic alkali. This reaction was carried out in fire-heated kettles and since overheating was destructive it was operated in a fluid condition and agitated. Excess caustic was used to attain the necessary fluidity.

Aylsworth in U. S. Patent 1,213,142 describes a process for the production of phenol from benzene monosulphonic acid by heating the sodium salt with caustic soda. He states the desirability of reducing the amount of excess caustic on page 1, lines 46 et seq. and by his process attains fluidity by passing the reacting materials in water solution thru a tube under pressure to prevent evaporation of water which introduces great mechanical difficulties and expensive operation.

I have found that the process can be performed in a particularly economical and efficient manner by using only a slight excess of caustic alkali over that amount required by the theoretical equation

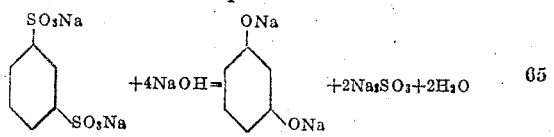

provided care is taken not to superheat the mixture of sodium benzene disulphonate and caustic soda during the period of the reaction. This is particularly difficult because a mixture containing only a slight excess of caustic alkali is a solid mass even at the elevated temperature of conversion and cannot be stirred to obtain a uniform temperature throughout the mass as is done in the ordinary process where a large excess of caustic soda is added to produce a liquid fusion. To obtain this desirable result I produce an intimate mixture of the sulphonate and the caustic soda and the resulting solid mass in a relatively thin layer is heated uniformly at the proper temperature by an appropriate means preferably a heated liquid bath. With this control, stirring is not required and this is an additional advantage as in the usual process the mechanical agitation stirs air into the mass and promotes oxidation with consequent loss of yield.

To more clearly explain my invention I give herewith a single example but it is to be understood that I do not limit myself to the details of this example.

I measure into a flat bottom sheet iron pan an amount of a water solution of benzene disodium sulphonate whose content of the latter is known. I then run into the same pan a measured amount of a water solution of caustic soda of known strength so that the caustic soda will be present to the extent of 15 to 25% in excess of the amount theoretically required to react with the sulphonate salt. The pan with its contents is then placed upon the surface of a pool of melted metal whose temperature is controlled at a predetermined point by any satisfactory means of heating and regulation known to the art. I prefer to maintain the temperature of the melted metal at from 375° C. to 400° C. after the water is boiled off from the reaction mixture. When the pan is placed on the surface of the melted metal, where it floats, a violent ebullition immediately takes place due to the rapid escape of the water and this results in very thorough mixing of the constituents. When the water has nearly all evaporated the mass has become a solid cake. This cake is then baked for the required length of time to cause the conversion to take place. It is then removed from the pan, lixiviated with water and the resorcin liberated from its sodium compound by acidification in the usual manner.

The iron pans may be of any area desired but they should be sufficiently deep to allow for the foaming which takes place during the preliminary evaporation of water. With pans six (6) inches deep I find that the resulting solid cake is from 1 to 1½ inches thick which is thin enough to obtain a uniform temperature throughout during the baking period. I may use a metal bath of such size that it will accommodate only one pan or many. The pans may be charged to the metal bath all at one time or at intervals. If the latter method is used, the process becomes semi-continuous whereat a pan containing a completely baked cake is removed at the far end of the bath at the time a fresh pan is inserted at the other end. The pans may be separate or linked together in the form of a belt which may be endless and actuated by chains and sprockets by hand or by power. The bath may be composed of lead, tin, zinc or mixtures of the same or of metal alloys or of fusible salts or mixtures thereof which melt below the temperature at which the baking operation is carried out.

The invention is not restricted to the method of obtaining the mixture of the sulphonate and the caustic soda as the dry salt and dry caustic may be powered and mixed together and then baked.

The temperature of the bath during the baking of the solid cake may vary from 350 to 425° C. with benzene sulphonate salts. Caustic potash or other caustic alkalies or mixtures of the same may be substituted for the caustic soda given in the example.

The process is generally applicable to the production of resorcinol, phenol, beta-naphthol which I generically refer to as phenols and similar fusions of sulphonate salts with alkali where the fusion is carried on at temperatures above 300° C. and where the alkali used reacts best in the absence of substantial amounts of water.

Claims:

1. The process of converting an alkali-metal sulphonate of the aromatic series into an alkali-metal phenolate by heating the alkali-metal sulphonate with an alkali-metal hydroxide in the proportion of between two molecules and two and one-half molecules of the alkali-metal hydroxide for each atom of sulphur present in the alkali-metal sulphonate at a temperature between 300° C. and 425° C. in a thin layer by means of heat conducted thereto thru a solid metal septum.

2. The process of converting alkali-metal benzene sulphonates into alkali-metal phenolates by heating the alkali-metal sulphonates with alkali metal hydroxides in the proportion of between two molecules and two and one-half molecules of the alkali-metal hydroxides for each atom of sulphur present in the alkali-metal sulphonates at a temperature between 300° C. and 425° C. in a thin layer by means of heat conducted thereto thru a solid metal septum.

3. The process of converting an alkali-metal salt of benzene meta disulphonic acid into an alkali-metal resorcinate by heating the alkali-metal salt of benzene meta disulphonic acid with an alkali-metal hydroxide in the proportion of between two molecules and two and one-half molecules of the alkali-metal hydroxide for each atom of sulphur present in the alkali-metal disulphonate at a temperature between 300° C. and 425° C. in a thin layer by means of heat conducted thereto thru a solid metal septum.

4. The process of converting disodium benzene meta disulphonate into sodium resorcinate by heating the disodium benzene meta disulphonate with sodium hydroxide in the proportion of between two molecules and two and one-half molecules of the sodium hydroxide for each atom of sulphur present in the disodium benzene meta disulphonate at a temperature between 350° C. and 400° C. in a thin layer by means of heat conducted thereto thru a solid metal septum.

In testimony whereof, I hereby affix my signature.

CHARLES RAYMOND DOWNS.